United States Patent
Knopp et al.

[11] Patent Number: 6,056,251
[45] Date of Patent: May 2, 2000

[54] ADJUSTABLE-HEIGHT COLUMN WITH DEPTH SPRING ACTION

[75] Inventors: Axel Knopp, Eitelborn; Elmar Keck, Koblenz, both of Germany

[73] Assignee: Stabilus GmbH, Koblenz, Germany

[21] Appl. No.: 09/059,048

[22] Filed: Apr. 9, 1998

[30] Foreign Application Priority Data

Apr. 16, 1997 [DE] Germany ............................ 197 15 892

[51] Int. Cl.⁷ .................................................. F16M 11/00
[52] U.S. Cl. ................... 248/161; 248/162.1; 248/188.5; 248/404; 248/406.2; 248/415; 248/631; 108/144.4; 108/147; 108/150; 91/27; 91/319; 92/85.13
[58] Field of Search ................................ 248/161, 162.1, 248/406.2, 415, 404, 631, 188.5; 108/144.11, 147, 150; 297/344.19; 91/27, 399; 92/85.13

[56] References Cited

U.S. PATENT DOCUMENTS

| | | | |
|---|---|---|---|
| 3,091,932 | 6/1963 | Webb | 91/27 |
| 3,711,054 | 1/1973 | Bauer | 248/161 |
| 3,937,307 | 2/1976 | De Kock | 188/300 |
| 4,108,416 | 8/1978 | Nagase et al. | 248/400 |
| 4,124,202 | 11/1978 | Hatakeyama | 188/300 |
| 4,245,826 | 1/1981 | Wirges | 297/344.19 |
| 4,257,582 | 3/1981 | Wirges | 267/120 |
| 4,635,908 | 1/1987 | Ludwig | 267/120 |
| 4,817,898 | 4/1989 | Locher | 248/161 |
| 4,964,625 | 10/1990 | Kawamura | 188/300 |
| 5,377,942 | 1/1995 | Knopp et al. | 248/161 |
| 5,839,719 | 11/1998 | Hosan et al. | 267/64.12 |

FOREIGN PATENT DOCUMENTS

| | | | |
|---|---|---|---|
| 7623283 | 1/1977 | Germany . | |
| 4326968 | 9/1994 | Germany . | |
| 2 039 996 | 8/1980 | United Kingdom | 92/85 B |

*Primary Examiner*—Derek J. Berger
*Assistant Examiner*—Walter Landry
*Attorney, Agent, or Firm*—Baker Botts L.L.P.

[57] ABSTRACT

Adjustable-height column, especially for chairs, includes a guide tube and a pneumatic, selectively blockable piston-cylinder unit for height adjustment located in the guide tube. The piston sealingly subdivides the cylinder into two operational chambers. Beginning at a defined retracted setting of the piston-cylinder unit, the blocking function is compulsorily canceled, in that a fluid flow connection between the two operational spaces is established which overrides the blocking function. An additional spring element is placed in series with the piston-cylinder unit to prevent a sudden collapse of the column.

6 Claims, 3 Drawing Sheets

ADJUSTABLE-HEIGHT COLUMN WITH DEPTH SPRING ACTION

BACKGROUND OF THE INVENTION

1. Field of the Invention

The present invention concerns an adjustable-height column, especially for chairs, of the type having a selectively blockable pneumatic piston-cylinder unit as a lift unit, in which the spring action of the piston-cylinder unit is bypassed at a desired depth (retraction) setting and is replaced by a mechanical spring element.

2. The Prior Art

German Utility Model G 7,623,283 discloses an adjustable-height column having a selectively blockable piston-cylinder unit as a lift unit. The piston-cylinder unit is a pneumatic spring which can be selectively blocked by means of a tripping device that acts on a blocking valve to maintain a desired height. At the desired height, the piston-cylinder unit has an elastic, or resilient, give under changing loads, which is regarded as comfortable, especially in chairs.

An additional spring, such as a compression spring or an elastomer block, is arranged in series with the pneumatic spring at the base of the column. Its purpose is to prevent the violent striking of the cylinder of the piston-cylinder unit with the bottom of the column, and/or to effectuate a spring action, when the piston rod is in its extreme retracted position.

It has been found that the spring action of the additional spring, in combination with the blocked pneumatic spring, is perceived as being rather uncomfortable, especially because the pneumatic spring exhibits the greatest rate of spring action (increased pushout force) when the piston rod is fully retracted.

The object of the present invention is to eliminate this deficiency in comfort which results from the described prior art.

SUMMARY OF THE INVENTION

According to the invention, the foregoing object is achieved by having the blocking function compulsorily canceled or overridden at a defined retracted (depth) setting of the piston rod by the provision of a fluid connection, at such depth setting, between the two operational chambers of the piston-cylinder unit. A natural assumption would be that the user of such an adjustable-height column, for example, when using an office chair, would be severely startled if the blocking function were eliminated. But the layout of the defined retracted setting is selected in such a way that the spring force of the additional spring is just taking hold, or has already acted, when the blocking function is overridden. Thus, a sudden collapse of the chair column cannot occur.

In one advantageous embodiment, the cylinder, proceeding from a normal setting range within which the blocking function is fully operational, exhibits a fluid bypass with an entrance and an exit in the reduced operating chamber in the retracted direction of the piston-cylinder unit, with the piston being located between the entrance and exit starting from the defined retracted setting. In the normal setting range, the bypass does not act. The bypass can be designed as an essentially axially running channel which bridges the piston where the latter performs a sealing function with the cylinder.

Alternatively, the bypass may be formed by a widening of the cylinder diameter. The blocking valve must under all circumstances be sealed off in relation to the cylinder. For this purpose, a sealing ring is mounted between the blocking valve and the cylinder. There are no problems with a cylinder the diameter of which is increased, because a somewhat larger sealing ring is then simply used, thus compensating for the enlarged diameter.

Typically, the selective blocking of the piston-cylinder unit is accomplished by a tripping device which actuates a blocking valve. In another embodiment, starting from the defined retracted setting, a depth stop member moves the tripping device into the trip setting to open the blocking valve and thus cancel or override the blocking function. No changes need be made in the piston-cylinder unit. It is not significant for the piston-cylinder unit that there are many types of applications.

One particularly simple stop member design calls for the stop to be a compression spring. The compression spring is simply pushed onto the column. As soon as the part to be adjusted (a seat holder, for example) has reached the defined retracted setting, the compression spring presses on the tripping device. Additional inward stroke motion of the piston-cylinder unit is then carried out in conjunction with, i.e., opposed by, compression of the spring.

BRIEF DESCRIPTION OF THE DRAWINGS

The invention will be described in greater detail with reference to the accompanying drawings, in which.

DETAILED DESCRIPTION OF PREFERRED EMBODIMENTS

Figure 1:
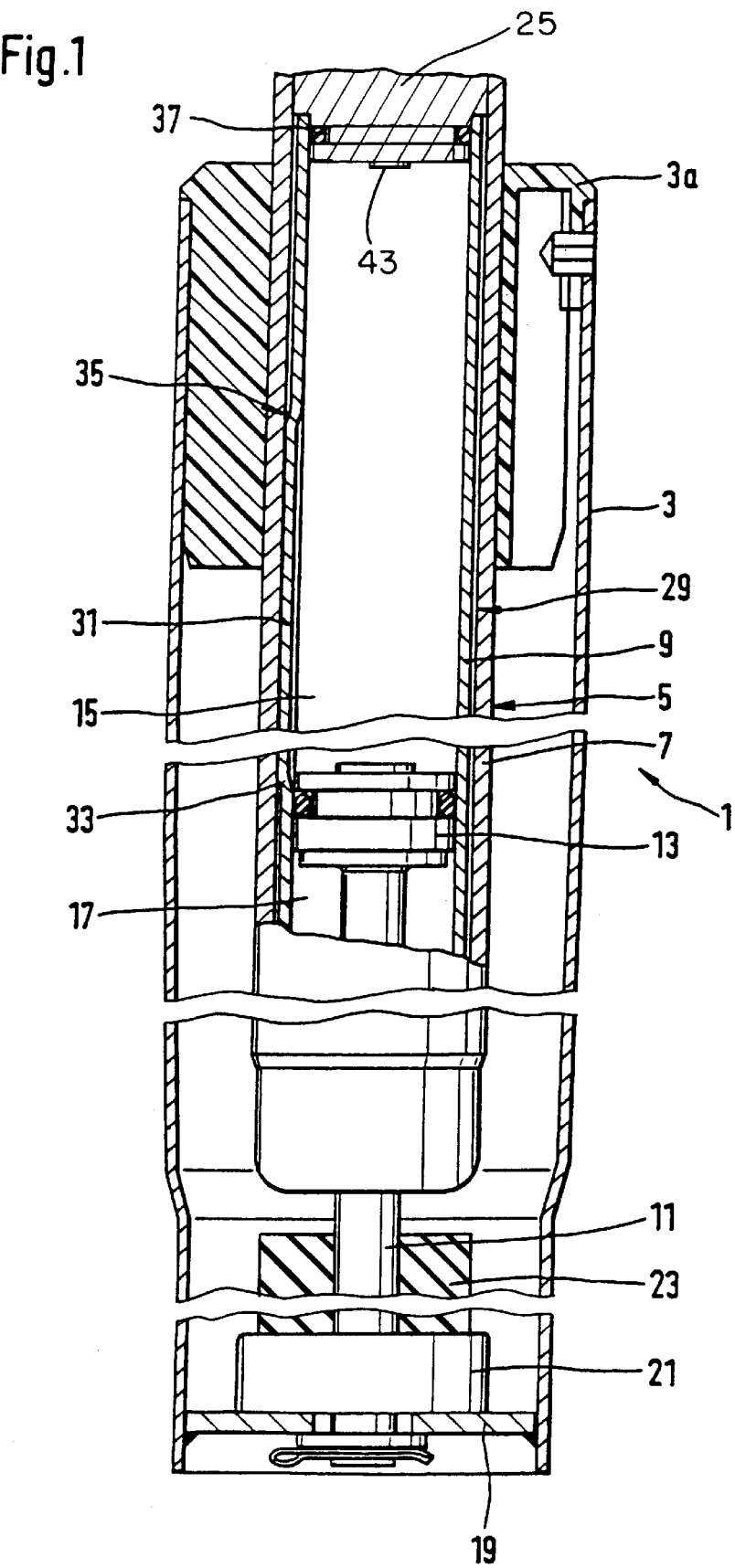
FIG. 1 is a partial vertical sectional view of an adjustable-height column wherein the fluid bypass or connection is an axially running channel.

FIG. 1 shows an adjustable-height column 1 having an outer guide tube 3 with a guide sleeve 3a at its upper end, within which a piston-cylinder unit 5 is slidingly supported. The unit 5 preferably is a pneumatic spring. It comprises a container tube 7, in which a cylinder 9, filled with a compressible medium, particularly a gas under pressure, acts as an energy accumulator. An axially movable piston rod 11 with a piston 13 is guided in the cylinder 9. The piston 13 sealingly divides the cylinder 9 into two operational chambers 15 and 17.

The extendable end of the piston rod is axially attached to a base 19 of the guide tube 3. A rotatable thrust bearing 21 permits the piston rod to rotate relative to the base. Above the thrust bearing 21, a spring element 23 is placed, which acts as an elastic stop at a defined retracted setting of the container tube 7, and is intended to prevent direct contact between the container tube and the pivot bearing 21.

Figure 3:
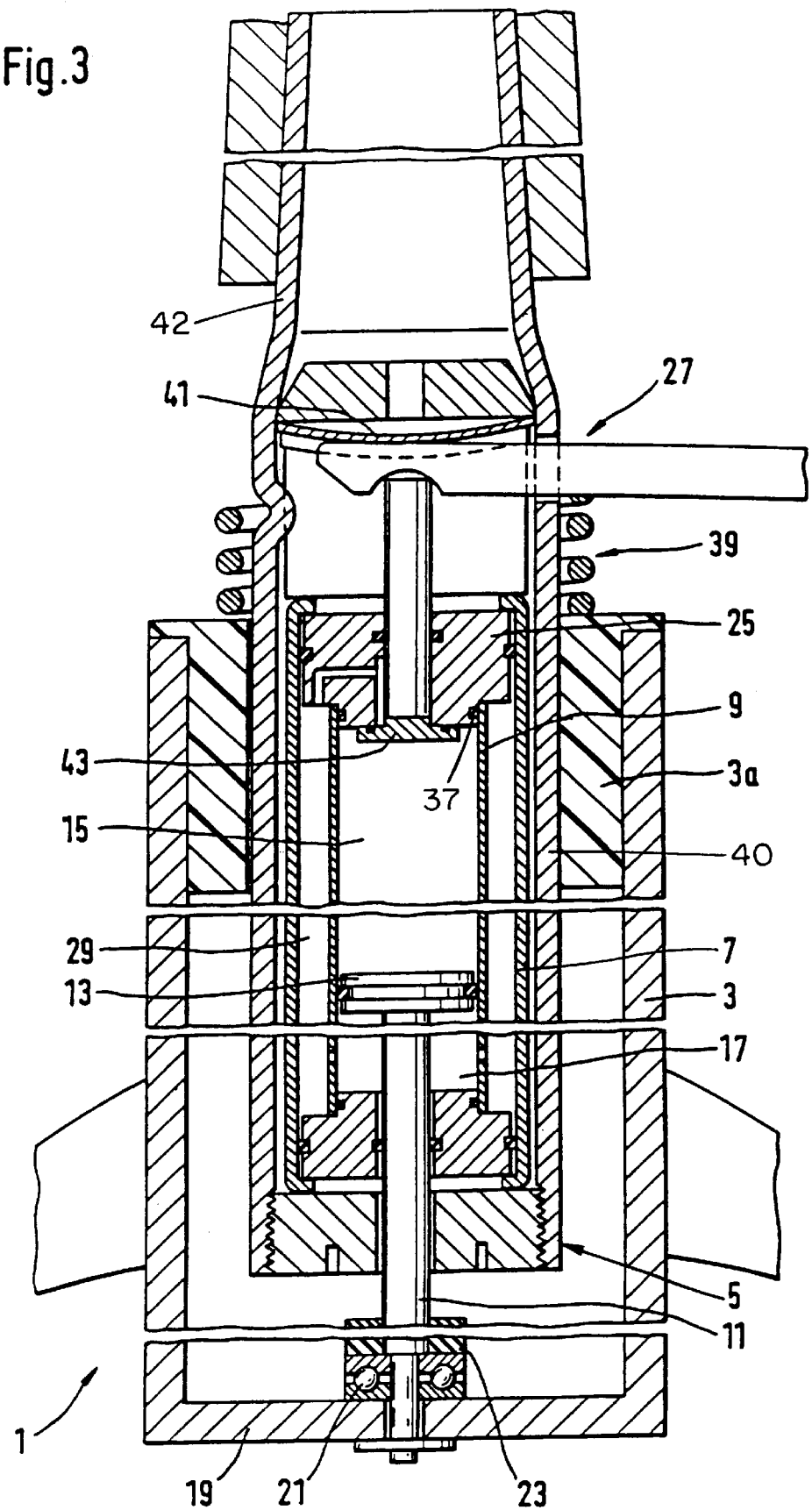
FIG. 3 is a vertical sectional view of an adjustable-height column with a depth stop member in the form of a compression spring which acts against a tripping lever at the desired depth setting.

As shown more fully in FIG. 3, the operating chamber 15 is closed off by a blocking valve 25, which is conventional. Blocking valve 25 is controlled at will by a manual tripping device 27, which is also conventional. Between the blocking valve and the lower operating chamber 17, a flow connection is established via an annular space 29 between the container tube 7 and the cylinder 9. If the blocking valve 25 is opened (by lifting the free end of the tripping device 27 to depress the valve 43 from the closed position of FIG. 3), fluid flow between the two operational spaces 15, 17 is permitted, and, as a result, the container tube 7 is free to move relative to the piston rod 11 and piston 13. When the valve 25 is closed, the piston-cylinder unit is held at its then existing length because fluid flow is blocked between the chambers 15 and 17.

The adjustable-height column is used very often in office chairs. Of necessity, a large adjustment range must be available for a large group of users. In accordance with the invention, so that people of small stature can be comfortable when seated, the piston-cylinder unit 5 is provided with a fluid bypass across the piston 13 in the form of at least one essentially axially running channel 31 formed in the cylinder 9. (See FIG. 1) The channel is located in the operational space 15, whose size is reduced as the piston-cylinder unit 5 retracts in length. An entrance 33 and an exit 35 form the connection to channel 31. By this means, the blocking action of the blocking valve 25 is canceled or overridden when the piston is moving within the region of the channel 31. Acting in this instance as spring elements in harmony between the stroke position of the piston relative to the axial spacing between the container tube 7 and the spring element 23, are: the pneumatic spring of the piston-cylinder unit 5 in conjunction with the spring element 23; or, if the arrangement is exactly as depicted in FIG. 1, only the spring element 23.

The channel 29 does not extend all the way to blocking valve 25, so that the sealing of the upper operational chamber is not impaired.

Figure 2:
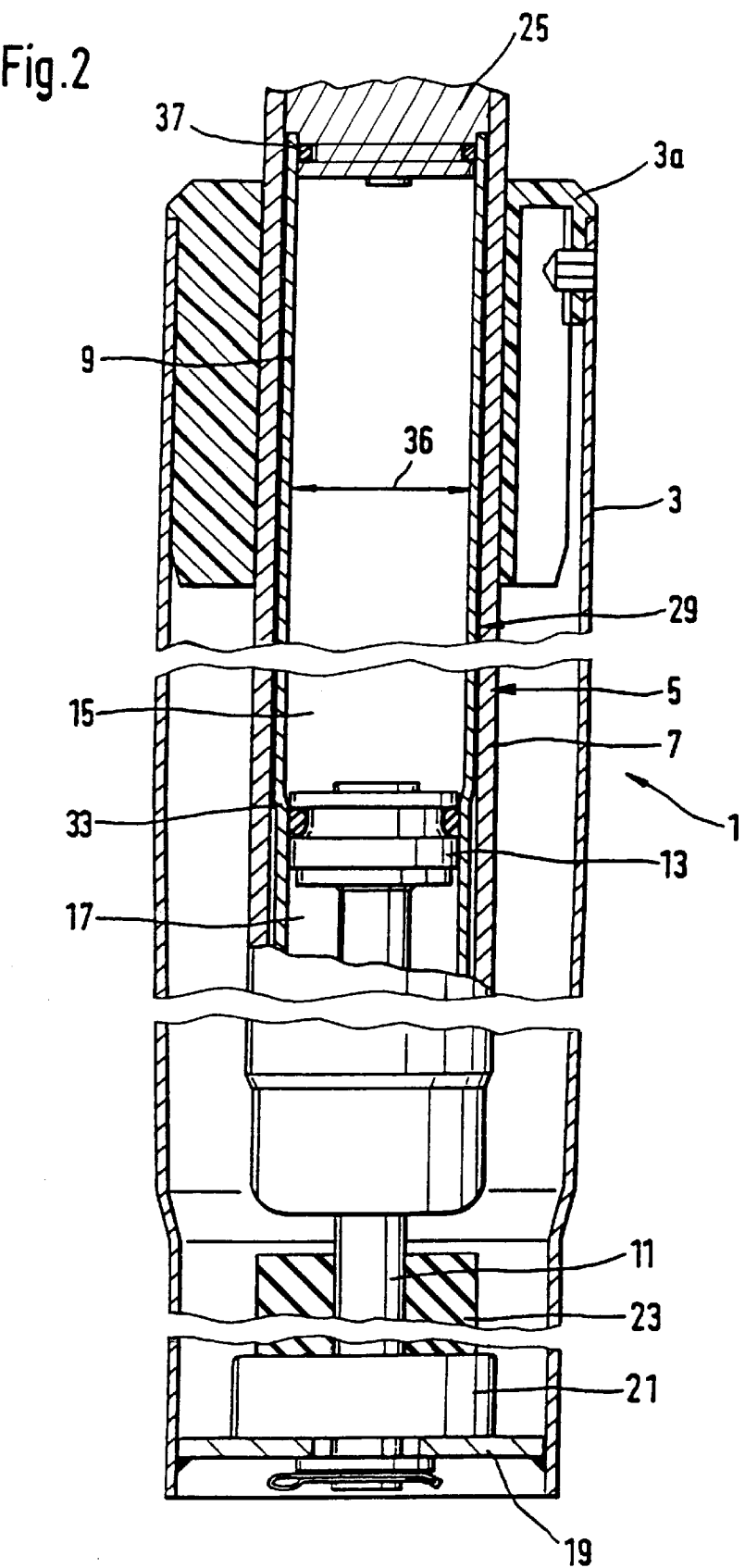
FIG. 2 is a partial vertical sectional view of an adjustable-height column in which the fluid bypass or connection is provided by an increase in the cylinder diameter.

FIG. 2 depicts how the operational spaces 15 and 17 can be connected by an expansion of the cylinder diameter 36 instead of a channel. The advantage of this embodiment is that no stroke length is lost for the outlet of the channel to the nominal dimension of the cylinder. The channel cross section itself is then the outlet. The cylinder 9 can be formed with the diameter expansion over the full length of the connection up to the blocking valve 25, and a somewhat larger sealing ring 37 simply can be used.

FIG. 3 shows an adjustable-height column whose function in regard to the piston-cylinder unit 5 corresponds to the description in accordance with FIG. 1, but which includes another embodiment of the structure for bypassing the blocking valve action of the unit 5 when the column reaches a desired retracted setting. In this instance, the piston-cylinder unit 5 includes an outer tubular member 40 whose upper end 42 is tapered for connection to the chair seat.

The adjustable-height column has a depth stop member 39 which, beginning at a defined retraction setting, acts on the tripping device 27 and in so doing moves the valve element 43 of the blocking valve 25 into the bypass or open setting, so that the operational chambers 15, 17 are connected to each other. Preferably, the stop member 39 is a compression spring which is fitted over the upper end of the outer tubular member 40 so as to rest on the guide sleeve 3a. A pretensioned spring 41 supports the tripping motion by forming with the stop member 39, a force couple that exerts a torque.

When the column has contracted in length to the point that the tripping lever 27 contacts the compression spring 39, the spring 39 urges the tripping lever upward, thereby opening the valve element 43. In addition, the compression spring 39 resiliently resists further contraction of the column.

The otherwise optional actuation of the tripping device 27 is bypassed by the compulsory action of the stop member 39. The operating pressure in the piston-cylinder unit 5, which acts on the valve element 43 of the blocking valve, reliably ensures that the blocking valve 25 is immediately closed if the stop member no longer engages the tripping device.

We claim:

1. An adjustable-height chair column, comprising:

a guide tube;

a selectively blockable pneumatic piston-cylinder unit received within said guide tube for height adjustment, said piston-cylinder unit including a cylinder, a piston rod, a piston carried by said piston rod which subdivides the cylinder into two operational chambers, and a selectively operable blocking valve for, when closed, blocking fluid flow between said operational chambers;

a pressurized gas within said operational chambers;

a spring element located in series between the guide unit and the piston-cylinder unit and being engaged to resiliently resist contraction in length of the piston-cylinder unit starting from a defined retracted setting of the piston-cylinder unit; and means operative at said defined retracted setting of the piston-cylinder unit for permitting fluid flow between the two operational chambers of the cylinder to override the blocking function of said blocking valve.

2. The adjustable-height column according to claim 1, wherein said fluid-flow permitting means comprises a bypass formed in the cylinder proceeding from an entrance corresponding to said defined retracted setting of the piston-cylinder unit and an exit spaced from said entrance in the direction of retraction of the piston-cylinder unit, whereby fluid flow through said bypass is permitted when said piston is located axially between said entrance and said exit.

3. The adjustable-height column according to claim 2, wherein said bypass is configured as an axially running channel in the wall of the cylinder.

4. The adjustable-height column according to claim 2, wherein said bypass comprises an enlargement in the internal diameter of the cylinder.

5. The adjustable-height column according to claim 1, wherein:

said column further comprises a tripping device for selectively opening said blocking valve; and said fluid-flow permitting means comprises a depth stop member for engaging said tripping device, starting from said defined-retracted setting of said piston-cylinder unit, to open said blocking valve.

6. The adjustable-height column according to claim 5, wherein said depth stop member comprises a compression spring.

* * * * *